United States Patent [19]  [11] 4,179,927
Saaski  [45] Dec. 25, 1979

[54] TEMPERATURE SENSING DEVICE

[75] Inventor: Elric W. Saaski, Richland, Wash.

[73] Assignee: Electric Power Research Institute, Inc., Palo Alto, Calif.

[21] Appl. No.: 837,451

[22] Filed: Sep. 28, 1977

[51] Int. Cl.² .................... G01K 11/14; G01K 11/18
[52] U.S. Cl. ................................. 73/350; 73/339 R; 73/356
[58] Field of Search ............... 73/356, 339 R, 350; 250/231 R

[56] References Cited

U.S. PATENT DOCUMENTS

| | | | |
|---|---|---|---|
| 3,513,704 | 5/1970 | Hatcher | 73/339 R |
| 3,591,810 | 7/1971 | Jackson | 73/356 |
| 3,672,221 | 6/1972 | Weil | 73/339 R |
| 3,770,965 | 11/1973 | Edwards | 250/231 R |
| 3,863,067 | 1/1975 | Gooley | 250/231 R |
| 3,960,017 | 6/1976 | Romanowski | 73/350 |

Primary Examiner—S. Clement Swisher
Assistant Examiner—Denis E. Corr
Attorney, Agent, or Firm—Flehr, Hohbach, Test, Albritton & Herbert

[57] ABSTRACT

A device for sensing temperature changes at an object, specifically within a transformer or the like, is disclosed herein. This device utilizes an electrically non-conductive sensor including a temperature responsive substance having the characteristic of changing in optical density with changes in temperature. In order to detect changes and/or to actually monitor the temperature the device provides means for detecting and/or monitoring the optical density of the temperature responsive means, thereby indicating the temperature at the object.

13 Claims, 4 Drawing Figures

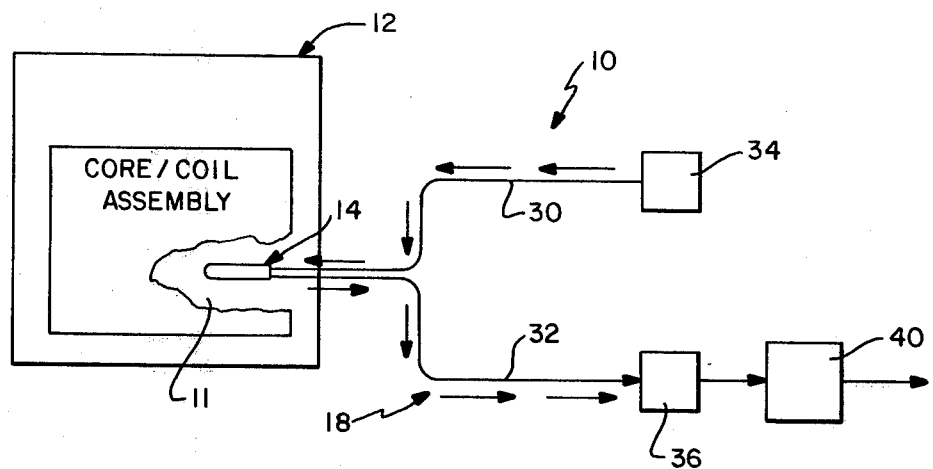
FIG.—1
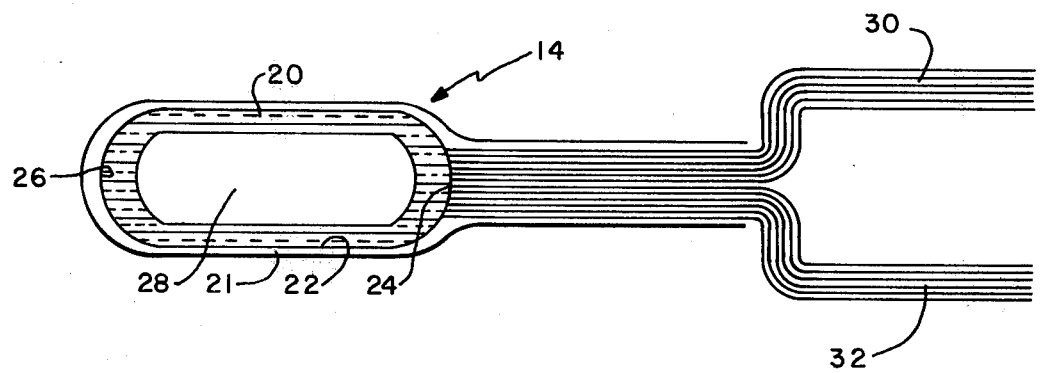
FIG.—2
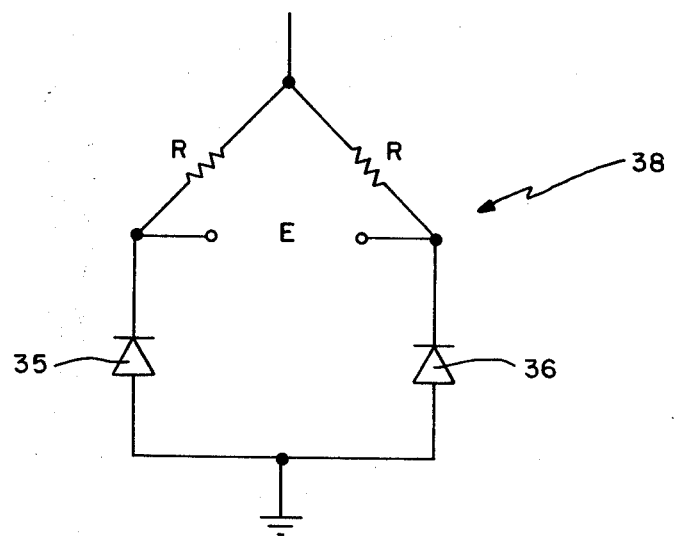
FIG.—3

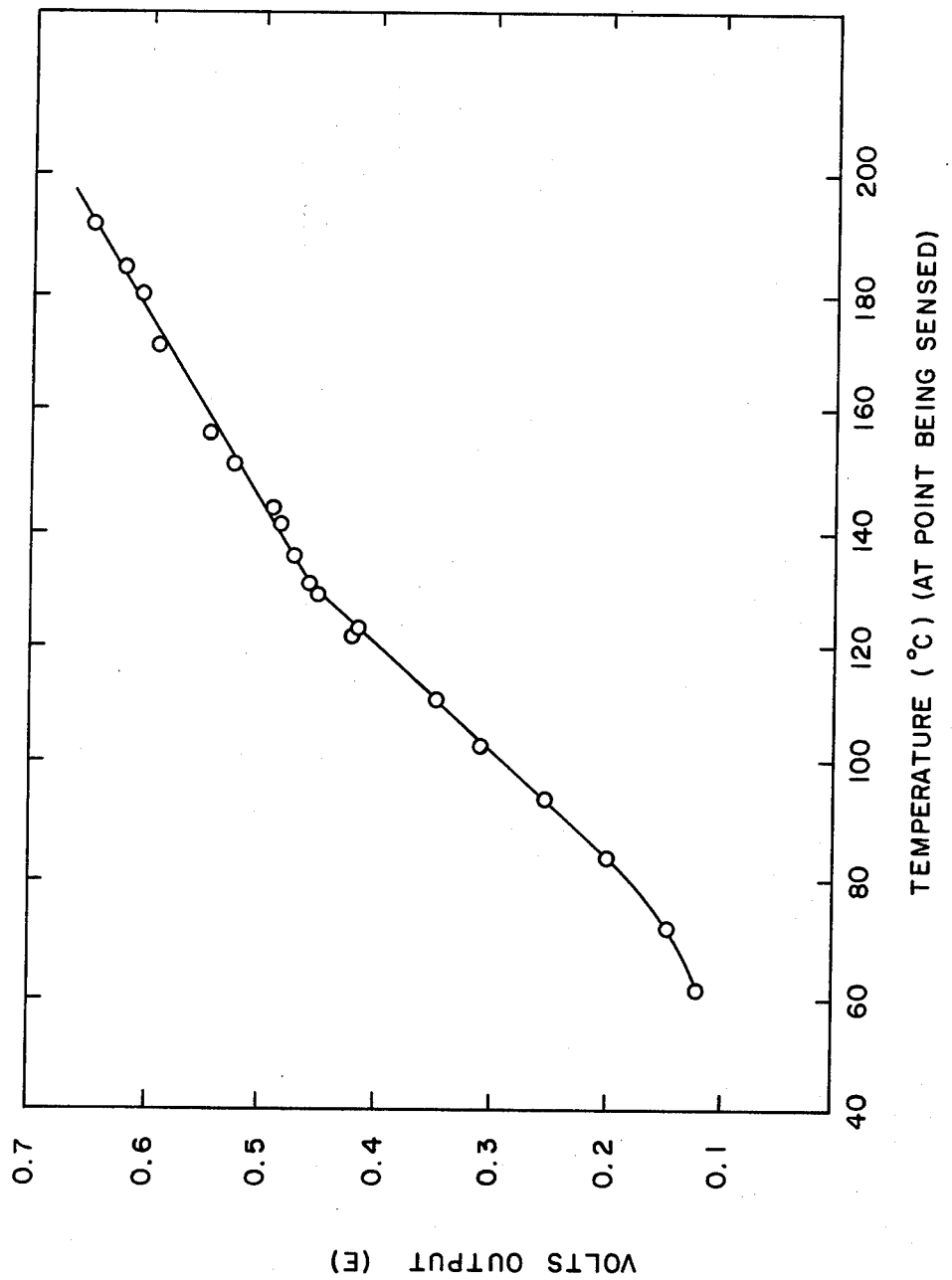

TEMPERATURE SENSING DEVICE

BACKGROUND OF THE INVENTION

The present invention relates generally to a device for sensing changes in temperature at a given point and more particularly to a temperature transducer which is particularly suitable for sensing temperature change in electrical transmission and distribution equipment or at other such locations where strong electric and/or magnetic fields are present or where the presence of metal is undesirable.

Heretofore, it has been common practice to monitor the temperature at particular points within an operating transformer by direct measurement, that is, by sensing the temperature directly at or in close proximity to the coils and/or core of the transformer. This has primarily been due to the fact that most monitoring devices utilized in the past included metal sensors and/or wires and that such sensors and/or wires located within the transformer could adversely effect the electric field distribution therein. This, in turn, could possibly lead to arcing and transformer failure. In order to avoid this type of problem, calculational schemes involving the top oil temperature of the transformer as a parameter have generally been employed to compute the temperature rise within its core and coils. However, experimental verification of this method has not been generally possible and hence it is not known whether this type of indirect measurement adequately reflects the temperatures at the desired points within the transformer.

More recently, semiconductor transducer/electronic modules and differential dielectric expansion devices have been investigated for direct coil temperature measurement. However, these semiconductor devices have met with only limited success because of their change in function at high temperature and because of their relatively large size.

As will be seen hereinafter, the temperature sensing device of the present invention is one which can monitor directly and accurately the temperature at a desired point within a transformer or similar equipment, even at high temperatures, without disturbing the electric or magnetic fields therein. As will also be seen, this device is one which is uncomplicated in design, relatively small in size, easy to manipulate and inexpensive to manufacture.

SUMMARY OF THE INVENTION AND OBJECTS

In accordance with the present invention, a device for sensing temperature changes at an object and particularly one which takes direct temperature measurements within a transformer or similar equipment without adversely affecting the function of the equipment is disclosed herein. As will be seen in more detail hereinafter, this device utilizes an electrically non-conductive sensor including temperature responsive means which changes in optical density with changes in temperature and means, also electrically non-conductive, for detecting these changes in optical density and, hence, for detecting changes in temperature at the object.

In accordance with a preferred embodiment of the present invention, the temperature sensing device is utilized as a transformer temperature transducer which monitors directly the temperature within the coils and/or core of the transformer. In this preferred embodiment, the sensor is electrically non-conductive as stated above and is quite small in size. It includes a sealed ampoule or envelope, one end of which has a light transparent or at least translucent section and the opposite end of which has a light reflective surface facing the light transparent section. Located within this ampoule or envelope is a gaseous substance which changes in optical density with changes in temperature, i.e., the temperature responsive means referred to above. Accordingly, with this preferred embodiment, changes in temperature at the particular monitoring point within the transformer changes the optical density of the gaseous substance and therefore its light absorption characteristic.

The detecting means in this preferred embodiment of the present invention includes a light source located outside the transformer and a first fiber optics bundle having one end located adjacent the light source and its opposite end located at the light transparent section of the envelope. In this way, light from the source is directed into the envelope and through the gaseous substance towards the light reflecting surface at the other end. Any light which is not absorbed by the gaseous substance as it first passes therethrough is reflected back towards the transparent section. Any light which makes the second pass through the gaseous substance and which is not absorbed, passes out through the transparent section of the envelope. As will be apparent hereinafter, this unabsorbed light is inversely proportionate to and represents the temperature at the point being monitored.

The preferred detecting means also includes a second fiber optics bundle having one end located at the light transparent section of the sealed envelope where that light which is not absorbed by the gaseous substance is collected. This second bundle in the preferred embodiment transmits the collected light to an appropriate circuit for conversion to a representive electrical signal which is processed to provide the desired information regarding the temperature at the point being monitored.

In accordance with the foregoing, one object of the present invention is to provide a device which senses temperature directly.

Another object of the present invention is to provide a temperature sensing device which utilizes only electrically non-conducting components at or in close proximity to the object being monitored.

Still another object of the present invention is to provide a temperature sensing device which reliably and accurately monitors temperature in magnetic and electric fields, for example in the coils and/or core of a transformer, without disrupting or otherwise adversely effecting these fields.

Yet another object of the present invention is to provide a temperature sensing device which is highly sensitive to temperature changes at the object being monitored, and which responds rapidly and reliably to these changes, even at extremely high temperatures.

A further object of the present invention is to provide a temperature sensing device which is small in size, uncomplicated in design, easy to manipulate and economical to manufacture.

Additional objects and features of the present invention will become apparent from the following description in which the preferred embodiments are set forth in detail in conjunction with the accompanying drawings.

BRIEF DESCRIPTION OF THE DRAWINGS

In the Drawings

FIG. 1 is a block diagram of an object, specifically an operating transformer, and a device constructed in accordance with the present invention and provided for sensing temperature changes at the object, particularly within the core/coil assembly of the transformer;

FIG. 2 is an enlarged plan view of one aspect of the device illustrated in FIG. 1.

FIG. 3 is a broken-away circuit diagram illustrating another aspect of the device in FIG. 1.

FIG. 4 is a graph illustrating an operating characteristic of an actual working device of the type illustrated in FIG. 1.

DESCRIPTION OF THE PREFERRED EMBODIMENTS

Turning to the drawings, wherein like components are designated by like reference numerals throughout the various figures, a device 10 which is constructed in accordance with the present invention and which is provided for sensing temperature changes at a predetermined point 11 in an object 12 or for generally monitoring the temperature at point 11 is illustrated in FIG. 1. As will be described in more detail hereinafter, this device utilizes a sensor 14 including a temperature responsive substance which changes in optical density with changes in the temperature. The sensor, as illustrated in FIG. 1, is located at the desired point of measurement in or at object 12. In the embodiment illustrated, object 12 is an operating transformer and sensor 14 is located at a predetermined point in its core/coil assembly.

As will be seen, a change in temperature at point 11 within the core/coil assembly causes the optical density of the temperature responsive means to change, thereby changing its light absorption capability. Hence, to monitor changes in temperature at point 11, device 10 monitors this change in optical absorption. This is accomplished by means of a detecting arrangement 18 which first directs a predetermined amount of light into the temperature responsive substance and then determines how much of this light is not absorbed, thereby indicating the optical density of the substance and therefore, by means of comparison, the change in temperature at point 11.

It should be quite apparent from the foregoing that device 10 is not only capable of detecting changes in temperature at point 11, but it is also capable of continuously monitoring the temperature in °C, °F or the like. This of course requires appropriate calibration and signal processing, as will be seen hereinafter. Obviously, the device also is capable of monitoring temperature within a predetermined range.

Turning now to FIG. 2, attention is specifically directed to sensor 14 which, as illustrated, includes a somewhat elongated sealed envelope or ampoule 20. This ampoule may be constructed of any suitable material, for example glass, which is electrically non-conductive. It is preferably transparent to light in its entirety and includes an outer protective coating 21, for example a TEFLON coating and an intermediate reflective silver coating 22. This latter coating surrounds all of the ampoule's exterior with the exception of an end section 24. In this way, ampoule 22 includes a light transparent section at one end, specifically end 24, and a light reflective surface 26 (the reflective coating) which is located at the other end of the ampoule and which faces light transparent section 24. In this regard, it is to be understood that the ampoule does not have to be transparent and it does not have to include as extensive a coating as coating 22. However, in the preferred embodiment of the present invention, it does require a transparent section 24 or at least one which is capable of passing some light, for example a translucent section at one end, and a reflector 26 at the other end. Hence, ampoule 20, with the exception of section 24 could be opaque and any suitable means can be utilized for providing reflective surface 26, for example an individual reflector at the end of the ampoule. It is not necessary to coat the entire ampoule with the reflective silver coating. However, this entire reflective coating is preferred so as to minimize the loss of light within the ampoule.

As stated above, sensor 14 includes a temperature responsive substance which changes in optical density with changes in temperature. This substance, indicated at 28, is contained within ampoule 20, as illustrated in FIG. 2. In a preferred embodiment of the present invention the substance is a polymeric gas, specifically one which can exist in two forms of differing optical density. In an actual working embodiment, device 10 utilizes nitrogen dioxide which does in fact exist in two forms, as a common reddish constituent of smog, $NO_2$, and as the optically transparent gas $N_2O_4$. At room temperature and one atmosphere total pressure, a given volume of this gas exists as about 20% $NO_2$ and 80% $N_2O_4$, while at 100° C., the equilibrium has shifted to about 90% $NO_2$ and 10% $N_2O_4$. This shift from $N_2O_4$ gas to $NO_2$ gas is quite dramatic, and the gas appears to visibly darken on heating. The basic concept for temperature measurement utilized by device 10 is to monitor the optical absorption of a given amount of this gas in the sealed ampoule which establishes constant total mass density of the combination of both forms, and then relate this absorption to $NO_2$ concentration. With other factors held constant, the $NO_2$ concentration is a direct measure of temperature and hence the temperature at the sensor can be directly monitored by appropriate calibration.

In order to monitor the optical absorption of gaseous substance 28, a predetermined amount of light is passed into it, preferably entirely through it, and the amount of light not absorbed is detected. In a preferred embodiment of the present invention, this is accomplished by means of two fiber optic bundles 30 and 32 which are illustrated in both FIGS. 1 and 2 and which are conventionally coated (not shown). As noted in FIG. 1, one end of bundle 30 is located adjacent a suitable light source 34, for example a light emitting diode or incandescent lamp which is powered by conventional means (not shown). As best illustrated in FIG. 2, the other end of this bundle is located adjacent light transparent section 24 of ampoule 20. The fiber optics bundle 32 on the other hand has one end connected to a circuit 36, for example a phototransistor, for converting light energy to a corresponding electrical signal. The other end of bundle 32 is also located at light transparent section 24 of ampoule 20 adjacent the corresponding end of bundle 30. Note that both fiber optic bundles are positioned at one end of the ampoule, i.e., at end 24. Also note that the other end of the ampoule, i.e., end 26, is free. It has been found that this single-ended arrangement of the sensor allows it to be easily manipulated, especially when it is necessary to locate it in tight places.

Fiber optic bundles 30 and 32, light source 34 and converter 36 together provide means for detecting changes in or for monitoring generally the optical density of gaseous substance 28, thereby indicating comparable changes in or monitoring generally the temperature at the sensor 14, for example at point 11 within the core/coil assembly of transformer 12. More specifically, predetermined light signals are produced at light source 34 and transmitted into gas substance 28 by means of bundle 30. This light enters the ampoule at transparent section 24 where it passes through the gas towards reflective surface 26. Any light not absorbed by the gas is reflected back towards the light ransparent section, again through the gas and any light not absorbed during its return to end 24 is collected by bundle 32 where it is transmitted to converter 36. The amount of light applied to the converter is inversely proportionate to and represents the optical density of gas 28 which, in turn, is proportionate to and represents the temperature at the sensor, that is, the temperature at point 11 within the coil/core assembly of transformer 12 when the sensor is positioned in the manner illustrated in FIG. 1.

This representative light signal is converted to a corresponding electrical signal by converter 36 which may be of any conventional type, for example a phototransistor, as stated previously. The phototransistor or other such means, when used, may comprise part of a bridge circuit, for example, one with a fixed reference voltage. Hence, any change at the phototransistor from its balanced operating reference causes an imbalance at the bridge output, thereby indicating a change in temperature from the reference temperature. In a preferred embodiment, as illustrated in FIG. 3, the phototransistor 36 forms one leg of a DC bridge 38 while a matched phototransistor, specifically a phototransistor 35 forms the other leg. The phototransistor 35 receives the light signal directly from the light source, and this compensates for changes in the light source intensity that may occur over large period of operation. A change in optical density of gas substance 28 results in an imbalance across the resistors R and hence at output E.

The optical signal from sensor 14, once converted to an electrical signal, for example the signal E at the output of DC bridge 38 may be conventionally treated and encoded to indicate (1) any changes in temperature at point 11, (2) the actual temperature at point 11, if of course the signal is appropriately calibrated, and/or (3) whether the temperature is within or outside a particular range. In other words, the electrical signal once initially provided can be conventionally treated to monitor various aspects of the temperature at point 11. One with ordinary skill in the art could readily provide conventional circuitry, indicated generally at 48, to accomplish this. Moreover, this circuitry could operate to treat a number of such signals, each corresponding to a different sensor for monitoring the temperature at a plurality of points.

Having described device 10 and the manner in which it functions to monitor changes in temperature or temperature itself within an object and specifically within the core/coil assembly of a transformer, the various objectives recited above should be quite apparent. First, it should be noted that the sensor itself as well as the lgith carrying fiber optic bundles are constructed of electrically non-conductive components and hence will not adversely affect the ambient electric or magnetic fields surrounding it. Hence, as stated previously, this device is most beneficial as a means for measuring temperature directly in electrical transmission and distribution equipment, but of course it is also applicable wherever there are strong electric and magnetic fields, or where the presence of metal is undesirable.

Because the nitrogen dioxide is itself highly sensitive to temperature changes and quite rapidly changes in optical density with changes in temperaure, device 10 is highly sensitive to temperature changes at the object being monitored and responds rapid and reliably to these changes to quickly and accurately reflect the temperature or temperature changes at the object. Moreover, unlike the semiconductors used heretofore, device 10 is quite stable at high temperatures such as those found within operating transformers.

In addition, the particular construction of sensor 14 is such that it can be made quite small and manufactured quite economically. Moreover, the incoming and outgoing light signals can be transmitted through separate fibers contained within a single fiber optics bundle to minimize material within the core/coil zone and so as to keep the size of the sensor down to a minimum. Moreover, the single-ended design of the sensor is not only compact but it can be readily handled and easily positioned at the desired location.

An actual prototype device has been constructed in accordance with the present invention and incorporates the essential features needed for monitoring the temperature within a core/coil assembly of a transformer. The incoming light signal in this embodiment is produced by means of a light emitting diode which provides a predetermined light output readily determined by those with ordinary skill in the art. This light is transmitted by a 0.8 meter long and 1 mm O.D. fiber optics bundle to the ampoule described. This ampoule includes $NO_2/N_2O_4$ as also described. The ampoule which is quite miniature in size as will be seen, has an optical path which is 1.2 mm in diameter and about 1 mm long. The active cell volume, that is the volume including the gas, is therefore about 1.1 $mm^3$. For initial experiments, the cell was epoxy bonded inside an aluminum coupon 7.6 mm wide by 10 mm high by 2.5 mm thick. The coupon also served as a means of mounting the fiber optic bundles, that is, the fibers were epoxy bonded into the coupon. The attenuated light signal from the sensor, that is, the light not absorbed by the gaseous substance, was returned by a 1 mm diameter fiber optic bundle to a phototransistor. This phototransistor was, in turn, one leg of a DC bridge. Accordingly, a change in gas optical density resulted in an imbalance of the bridge. While this imbalance could be amplified and displayed on a digital readout and/or appropriately converted to an equivalent temperature by conventional means, this was not done. Rather, the unamplified bridge output was measured between 60° C. and 200° C.

The graph in FIG. 4 illustrates the actual voltages attained for known temperatures at the sensor. As noted, a total swing of about 0.5 volts was observed. It should however be emphasized that the response curve shown here is representative in shape and magnitude for a polymeric gas sensor of the type described and that the shape of the curve will depend to some extent on several variables such as gas fill pressure, the shape of the ampoule housing, the gas as well as other factors including detector design.

It is to be understood that the actual working embodiment and the graph in FIG. 4 have been provided for purposes of illustration only and are not intended to limit the scope of the present invention. Moreover, it is to be understood that the temperature sensing device of the present invention is not limited to the preferred embodiment or embodiments described above. For example, while it has been found that a polymeric gas, particularly nitrogen dioxide, which changes in optical density with changes in temperature, is most desirable as part of sensor 14, any suitable means which functions in the same way and which is electrically non-conductive may be utilized. An appropriately treated plastic, glass or crystalline material which is suitably shaped and sized may for example be utilized. Moreover, while in a preferred and most practical embodiment of the present invention, the detecting means 18 includes a light source and fiber optic bundles, it could comprise other means for detecting changes in optical density of the gas in sensor 14. For example a light source could be located in close proximity to the sensor, especially in the absence of an electric and/or magnetic field. Further, conventional circuit components, for example, a power supply and electrical leads for the present invention may be readily supplied by those with ordinary skill in the art.

What is claimed is:

1. A device for sensing temperature changes at an object, comprising:
    (a) a sensor including electrically non-conductive temperature responsive media which changes in optical density with changes in temperature, said media including the combination of gaseous $NO_2$ and gaseous $N_2O_4$ the proportion of each depending upon the temperature at said sensor, said combination having constant total mass density, said sensor being adapted for positioning adjacent said object, whereby changes in temperature at said object changes the proportions of said gases and optical density of said media and therefore the light absorption characteristic of said media, and
    (b) means for detecting changes in optical density of said temperature responsive media, thereby indicating changes in temperature at said object, said detecting means including
        (i) first means for directing a predetermined amount of light from a light source into said temperature responsive media, and
        (ii) second means for detecting the amount of light not absorbed by said temperature responsive media, whereby a change in temperature at said object will change the amount of light detected by said second means.

2. A device according to claim 1 wherein said first means includes a fiber optics bundle adapted to direct light from said light source to said object.

3. A device according to claim 1 wherein said second means includes a fiber optics bundle adapted to direct said detected light from said temperature responsive media to a remote location.

4. A device according to claim 1 wherein said sensor includes a sealed envelope for housing said temperature responsive media, said envelope including a section at one end thereof, which section is capable of passing light therethrough, and a light reflecting surface at an opposite end thereof, said light reflecting surface facing said section.

5. A device according to claim 4 wherein said light passing section is transparent to light.

6. A device for sensing temperature changes at a predetermined point within an object, comprising:
    (a) a sensor consisting of a gaseous combination of $NO_2$ and $N_2O_4$ which changes in optical density with changes in temperature, said combination having constant total mass density, said sensor being adapted for positioning at said predetermined point, whereby changes in temperature at said predetermined point changes the optical density and therefore the light absorption characteristic of said gaseous combination;
    (b) a light source located at a remote location relative to said point;
    (c) a first fiber optics bundle extending from said light source to a first fixed point at said sensor for directing a predetermined amount of light into said gaseous combination; and
    (d) a second fiber optics bundle extending from a second fixed point at said sensor to a remote location for detecting the amount of light not absorbed by said gaseous combination and transmitting said detected light to said location, whereby a change in temperature at said predetermined point will change the amount of light detected and transmitted by said second fiber optics bundle.

7. A device according to claim 6 wherein said sensor includes a sealed envelope for housing said gaseous combination, said envelope including a section at one end thereof, which section is capable of passing light therethrough, and a light reflecting surface located at the other end and facing said light passing section, said fiber optics bundles having adjacent ends located at said light passing section of said envelope, whereby light from said first bundle enters said gaseous substance through said section and whereby that light not absorbed is reflected back to said second bundle by said reflector means through said light passing section.

8. A device according to claim 7 wherein said light passing section is transparent to light.

9. A device according to claim 6 including means for converting the light detected by said second bundle to an electrical signal and for treating the signal so that it is indicative of the relative temperature at said predetermined point.

10. A device for monitoring temperature at a predetermined point within electric and magnetic fields in a transformer, said device comprising:
    (a) a non-metallic sensor located at said predetermined point, said sensor including
        (i) a sealed envelope one end of which has a light transparent section and an opposite end of which has a light reflective surface facing said light transparent section, and
        (ii) a gaseous substance located within said envelope, said gaseous substance being of the type which changes proportionately in optical density with changes in temperature, whereby changes in temperature at said predetermined point within said transformer proportionately changes the optical density and therefore the light absorption characteristic of said gaseous substance;
    (b) a light source in the form of a light emitting diode located outside said transformer;
    (c) a first fiber optics bundle having one end located adjacent said light source and its opposite end located at the light transparent section of said envelope, whereby light from said source is directed into said envelope and through said gaseous substance towards said reflective surface such that any light not absorbed by said gaseous substance is reflected back toward said section, whereby said unabsorbed light is proportionate to the optical density of said gaseous substance and therefore the temperature at said point;

(d) electrical circuit means including a phototransistor for converting a light signal to a corresponding electrical signal; and (e) a second fiber optics bundle having one end located at said circuit means and its opposite end located at said light transparent section, whereby any of said light which is not absorbed by said gaseous substance and which passes out of said transparent section is directed to said circuit means for conversion to an electrical signal whereby said signal is proportionate to said light and therefore the temperature at said point; and (f) means for treating said signal so as to indicate the actual temperature at said predetermined point, said treating means including a DC bridge circuit including said phototransistor connected in one leg of said bridge, a second phototransistor connected in a second leg of said bridge, said second phototransistor being positioned to receive light directly from said light emitting diode.

11. A device according to claim 10 wherein said gas includes $NO_2$ and $N_2O_4$.

12. A device according to claim 10 wherein said sensor is a miniaturized sensor.

13. A device for sensing temperature changes at a predetermined point, comprising:

(a) a sensor including electrically non-conductive temperature responsive media which changes in optical density with changes in temperature, said media being adapted for positioning at said point, whereby changes in temperature at said point changes the optical density of said media; and (b) means for detecting changes in optical density of said temperature responsive media, thereby indicating changes in temperature at said point, said detecting means including (i) a light source located at a remote location relative to said point, (ii) first means for directing a predetermined amount of light from said source into said temperature responsive media, and (iii) second means for detecting the amount of light not absorbed by said temperature responsive media and for producing an electrical signal in response thereto, said second means including a DC bridge circuit including one photosensitive electrical device connected in one leg of the bridge circuit and a second photosensitive electrical device connected in a second leg of the bridge, said second photosensitive electrical device being positioned to receive light directly from said light source.

* * * * *